(12) United States Patent
Hossain et al.

(10) Patent No.: US 8,472,375 B2
(45) Date of Patent: *Jun. 25, 2013

(54) METHOD AND APPARATUS FOR SCAN MODE SELECTION DURING AN EVDO TRAFFIC STATE

(75) Inventors: Asif Hossain, Ottawa (CA); Hao Xue, Ottawa (CA); Shahid Chaudry, Ottawa (CA); Wen Zhao, Ottawa (CA)

(73) Assignee: Research In Motion Limited, Waterloo (CA)

( * ) Notice: Subject to any disclaimer, the term of this patent is extended or adjusted under 35 U.S.C. 154(b) by 786 days.

This patent is subject to a terminal disclaimer.

(21) Appl. No.: 12/254,191

(22) Filed: Oct. 20, 2008

(65) Prior Publication Data

US 2009/0092102 A1   Apr. 9, 2009

Related U.S. Application Data

(63) Continuation of application No. 11/124,287, filed on May 9, 2005, now Pat. No. 7,454,208.

(51) Int. Cl.
*H04W 4/00* (2009.01)
(52) U.S. Cl.
USPC ........... 370/328; 370/335; 370/342; 370/441; 370/494
(58) Field of Classification Search
None
See application file for complete search history.

(56) References Cited

U.S. PATENT DOCUMENTS

| | | | |
|---|---|---|---|
| 5,613,213 A | 3/1997 | Naddell et al. | |
| 5,903,832 A | 5/1999 | Seppanen et al. | |
| 6,119,003 A | 9/2000 | Kukkohovi | |
| 6,603,755 B1 | 8/2003 | Parker | |
| 6,625,451 B1 | 9/2003 | La Medica et al. | |
| 6,954,649 B2 | 10/2005 | Kotzin | |
| 7,184,768 B2 | 2/2007 | Hind et al. | |
| 7,483,415 B2* | 1/2009 | Yeom | 370/352 |
| 7,555,069 B2* | 6/2009 | Kim | 375/340 |
| 2002/0039892 A1 | 4/2002 | Lindell | |
| 2003/0017828 A1 | 1/2003 | Kotzin et al. | |
| 2004/0009751 A1 | 1/2004 | Michaelis et al. | |
| 2004/0087305 A1 | 5/2004 | Jiang et al. | |
| 2004/0192301 A1 | 9/2004 | Shi | |
| 2005/0043026 A1 | 2/2005 | Brok et al. | |
| 2005/0047398 A1* | 3/2005 | Yeom | 370/352 |

(Continued)

FOREIGN PATENT DOCUMENTS

EP    1041846 A    10/2000

OTHER PUBLICATIONS

EP05103804.0—Article96(2)EPC—Nov. 10, 2006.
EP05103804.0—Search Report dated Feb. 16, 2006.

(Continued)

*Primary Examiner* — Bob Phunkulh
(74) *Attorney, Agent, or Firm* — Moffat & Co.

(57) ABSTRACT

A method and apparatus for user data traffic handling for an EVDO enabled hybrid mode mobile device, the method having the steps of: blocking a system selection at the mobile device until no EVDO traffic state exists, the blocking step includes either monitoring whether a user changes a scan mode on the mobile device; and if the user changes the scan mode, checking whether the mobile device is in an EVDO traffic state; and if yes delaying a system selection until the EVDO traffic state is ended, or monitoring whether a user is in an EVDO traffic state, and if yes, preventing a user from accessing a scan mode menu on the mobile device.

9 Claims, 5 Drawing Sheets

U.S. PATENT DOCUMENTS

2005/0188113 A1* 8/2005 Lee et al. .................. 709/249
2006/0126564 A1 6/2006 Ramanna et al.
2006/0153134 A1* 7/2006 Lee et al. .................. 370/331
2006/0153139 A1* 7/2006 Bae et al. .................. 370/335
2006/0234707 A1* 10/2006 Byun et al. ................ 455/436
2006/0246885 A1* 11/2006 Lee ............................ 455/421

OTHER PUBLICATIONS

EP05103804.0—Examiner's Report dated Aug. 17, 2007.
"The Performance of Voice over IP over 3G Downlink Shared Packet Channels under Different Delay Budgets" 0-7803-7954-3/03/$17.00 c 2003 IEEE, beginning p. 2501.

* cited by examiner

METHOD AND APPARATUS FOR SCAN MODE SELECTION DURING AN EVDO TRAFFIC STATE

CROSS REFERENCE TO RELATED APPLICATIONS

This application is a Continuation of, and claims the benefit of, U.S. non-provisional patent application Ser. No. 11/124,287 entitled "Method And Apparatus For Scan Mode Selection During An Evdo Traffic State" filed May 9, 2005 which is incorporated herein by reference.

FIELD OF THE APPLICATION

The present application relates to the optimization of a data device in a hybrid EVDO and CDMA2000 network, and in particular when the mobile device is in an EVDO traffic state.

BACKGROUND

The CDMA 1x/EVDO mobile system is a hybrid system that has evolved from the CDMA2000 system. EVDO stands for Evolution Data Only or Data Optimized and as suggested by this, is a data only system. One advantage of EVDO systems is that, it allows a high transfer rate for data. Another advantage of 1x EVDO System operating in hybrid mode is the ability to receive circuit switched services, such as voice calls, even during active data session in EVDO System.

A mobile device operating in 1x/EVDO hybrid mode will first acquire the CDMA 1x system, and once this system has been acquired and is in an idle state the mobile device will then try to acquire the EVDO system. The CDMA 1x system will always have precedence over the EVDO system according to the current design.

Since the main advantage of hybrid mode is the ability to receive circuit switched mobile terminated calls, by design, when the CDMA system is dropped for any reason, the EVDO system will also be dropped and the mobile station will immediately try to establish a new CDMA 1x connection.

On current mobile devices, a user has the option of changing the scan mode (alternatively called the network selection mode). The scan mode determines which systems the mobile device can connect to and dictates the device's System Determination Algorithm. Various options include the home network only, which prevents roaming charges, and various analog and digital options as will be known to those skilled in the art. Scan modes can be changed, for example, to avoid roaming charges when a home network can be acquired.

A side effect of changing the scan mode on current mobile devices is that they immediately drop the current CDMA network and search for a new network according to the System Determination algorithm as per the selected scan mode. In the hybrid mode that includes an EVDO connection, if the mobile device drops the CDMA 1x connection, the EVDO connection is also dropped. The problem is that when the mobile device has an EVDO traffic channel acquired and is downloading data, dropping the EVDO connection undesirably disrupts the user's download by dropping the data channel.

BRIEF DESCRIPTION OF THE DRAWINGS

The present apparatus and method will be better understood with reference to the drawings in which.

DETAILED DESCRIPTION

Figure 1:
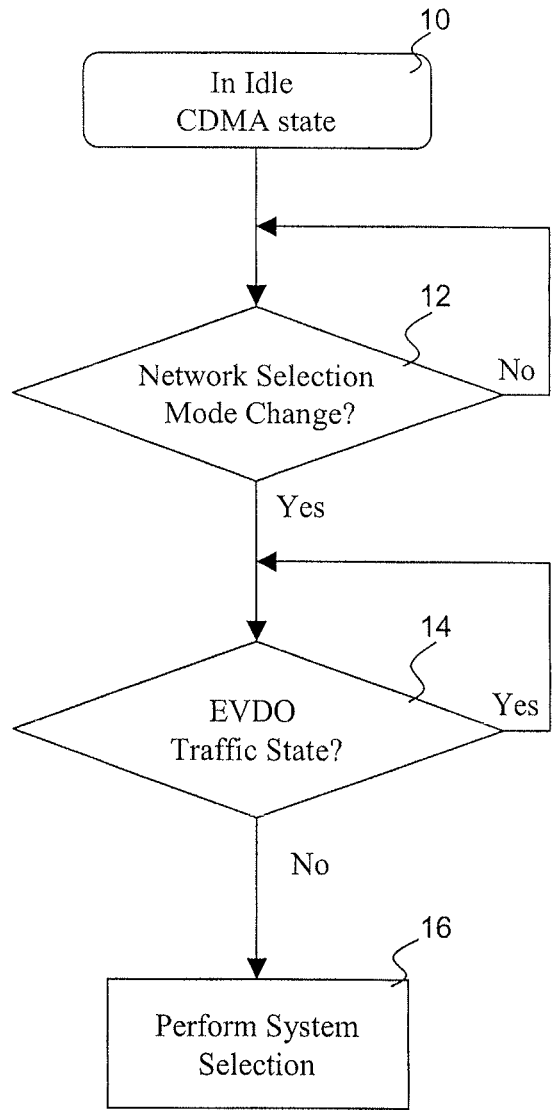
FIG. 1 is a flow chart of a preferred method for ensuring that system selection does not drop an EVDO traffic channel.

The present application provides for a method and apparatus to prevent a scan mode change when an EVDO traffic channel is established. Specifically, the present system and method provide for a check when a scan mode change is made to determine whether the device is in an EVDO traffic state. If the device is in an EVDO traffic state, the mobile device waits until the EVDO traffic state ends at which point the system selection occurs. Alternatively, the device could prevent the user from changing the scan mode by hiding the scan mode selection menu when the mobile device is an EVDO traffic state.

As will be appreciated by those skilled in the art, keeping the EVDO traffic state open until the data transaction is complete will prevent any delay in the data transaction and also save network resources since the EVDO connection would need to be re-established and any lost packets due to the dropping of the EVDO channel would have to be re-transmitted. Since a user likely pays for each packet that is transmitted, this will also save the user costs. Other advantages will be appreciated by those skilled in the art.

The present application therefore provides a method for user data traffic handling for an Evolution Data Only or Data Optimized 'EVDO' enabled Code Division Multiple Access 'CDMA' prioritized hybrid communications mode mobile device, the method comprising the steps of: blocking a voice services system selection at the mobile device until no EVDO traffic state exists.

The present application further provides an Evolution Data Only or Data Optimized 'EVDO' enabled Code Division Multiple Access 'CDMA' prioritized hybrid communications mode mobile device characterized by: means for blocking a voice services system selection at the mobile device until no EVDO traffic state exists.

A mobile device user can change the scan mode (network selection mode) generally by using a menu on the mobile device. The scan mode can be set to various options and can be, for example, set to home only, which only allows the mobile device to connect with the home network; digital only, which allows the device to connect to cellular or PCS networks using CDMA and/or EVDO; auto A which allows the device to connect to a portion of the digital cellular network; auto B which allows the mobile device to connect to another portion of the digital cellular network; analog, which only allows only analog connections; automatic, which allows the device connect to any network; and other networks which are known to those skilled in the art. The present application is not meant to be limited to the selection of any specific scan mode, nor is the list of various scan modes outlined exhaustive.

A consequence of the user changing the scan mode is the dropping of the current network that the mobile device is in.

As indicated above, when in a hybrid mode, the mobile device gives precedence to the CDMA (code division multiple access) 1x network. The CDMA 1x network is generally used for voice and SMS (short message service) services when in the hybrid network, whereas the EVDO network is generally used for data services. The mobile device gives precedence to voice services, having the effect that voice calls are not routed to a voice mailbox if the user is downloading data at that time.

A consequence of giving the CDMA network the higher priority is that if the CDMA 1x network is lost, the mobile device will also drop the EVDO system in order to re-acquire the CDMA network. As will be appreciated, if the user therefore changes a scan mode option, the mobile device drops the current CDMA 1x network to acquire a network according to the selected scan mode. By default dropping the EVDO network results in wasted network resources, wasted mobile battery resources, and possibly misses critical information that the user needs to know immediately.

Reference is now made to FIG. 1. A better solution than the above would be to prevent the mobile device from performing a system selection until the data download is complete. As illustrated in FIG. 1, the mobile device needs to be in CDMA 1x idle state for the method of FIG. 1 to proceed. As will be appreciated by those skilled in the art, if the mobile device is not in an 1x idle state then there will either be no data being downloaded since the active CDMA state will pre-empt the data download, or if no CDMA1x network is connected then the mobile device will be attempting to acquire a CDMA 1x network and will have no EVDO network established in that case.

If the mobile device is in CDMA 1x idle state 10 the mobile device can monitor whether a network selection mode (scan mode) change is being attempted. This is illustrated in FIG. 1 as step 12. Step 12, as illustrated, shows the mobile device continuously checking for a network selection mode change and if no change is made the step loops back on itself. As would be appreciated by those skilled in the art, this could be implemented using various means including the use of interrupts if the network selection mode changes and CPU resources do not need to continuously be checking whether the network selection mode change is occurring.

If the mobile device detects in step 12 that a network selection mode change is occurring the mobile device proceeds to step 14. In step 14 the mobile device checks whether it is currently in an EVDO traffic state. If it is in an EVDO traffic state, the mobile device will stay in step 14 until the traffic state ends thus preventing the dropping of the current CDMA 1x network due to the network selection mode change before the data download occurs.

Once the EVDO traffic state has ended and thus the complete download has occurred, the mobile device proceeds to step 16 in which a system selection is performed. As indicated above, the system selection performance requires the dropping of the current CDMA network and thus the EVDO network and the re-acquiring of both.

Figure 2:
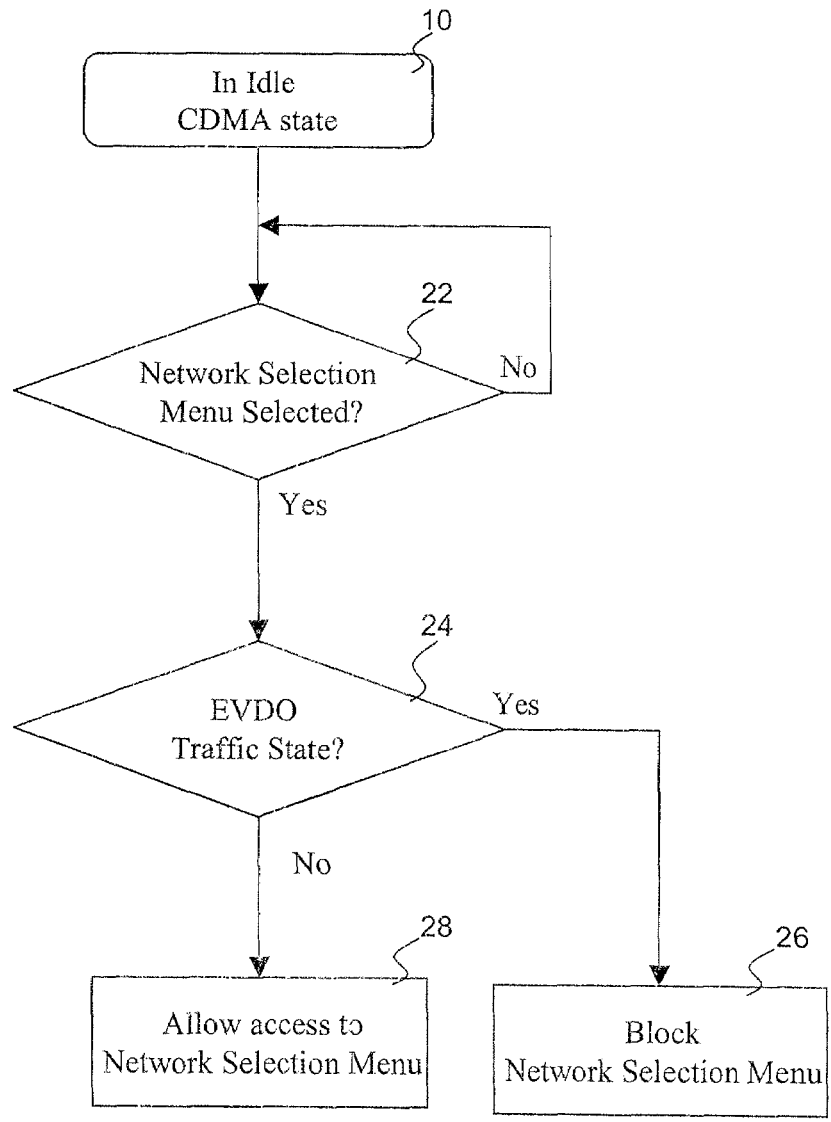
FIG. 2 is a flow chart of an alternative embodiment of the method for ensuring that the EVDO traffic channel is not dropped when performing network selection mode changes.

In an alternative embodiment, instead of monitoring whether a network selection mode change has occurred in step 12 the mobile device instead could block the user from being able to perform a network selection mode change while an EVDO traffic state exists. Reference is now made to FIG. 2.

FIG. 2 illustrates an alternative in which the mobile device is in a CDMA 1x idle state 10. The mobile device, in step 22 monitors whether a user has accessed the network selection menu would allow them to change the scan mode. If step 22 determines that the user is attempting to change the scan mode the mobile device in step 24 can check whether the mobile device is in EVDO traffic state. If yes then the mobile device can proceed to step 26 in which an error message can be displayed to the user indicating that the user is currently in an EVDO traffic state and asks the user to try again. Alternatively, if in step 24 it is determined that there is no EVDO traffic state then the mobile device can allow the user to enter into the menu to change the scan mode in step 28. A further option in FIG. 2 is that if the EVDO is in a traffic state as determined by step 24 then the mobile device could prompt the user if they are sure that they want to enter into the scan mode selection and that data transfer could be lost if they do. The user would then have the option of dropping the CDMA and EVDO channel.

Figure 3:
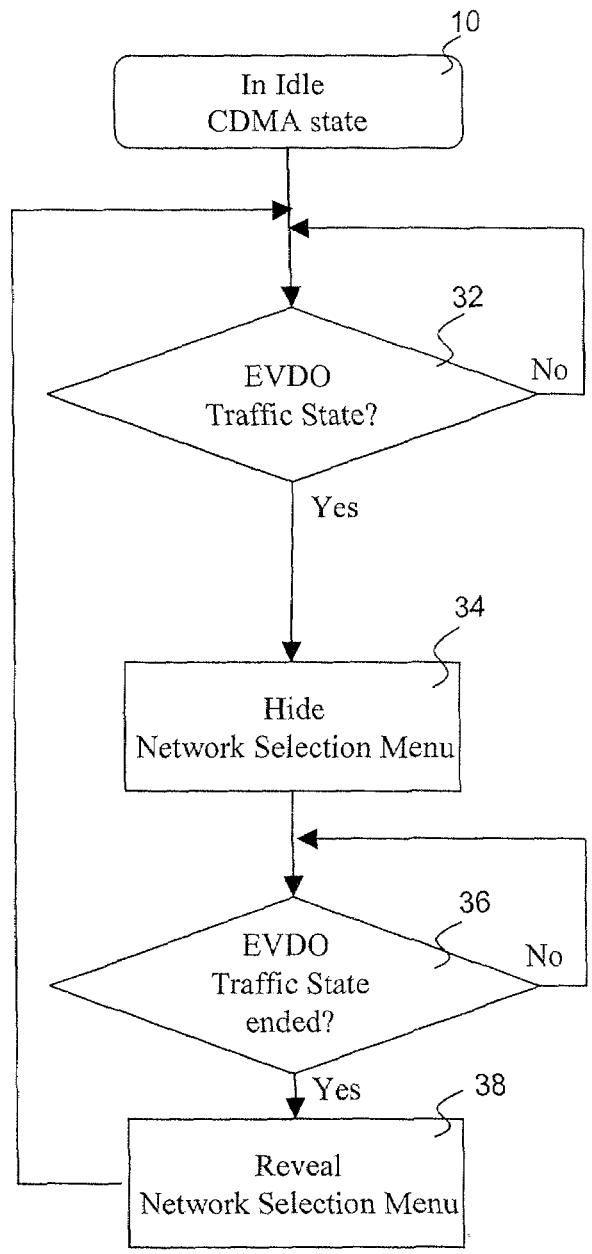
FIG. 3 is an alternative flow chart of a method for ensuring that the EVDO traffic channel is not dropped by hiding the network selection menu during an EVDO traffic state.

A further option is that the mobile device monitors whether it has entered into an EVDO traffic state. If the device enters a EVDO traffic state, the mobile device could hide the network selection menu completely, thus preventing the user from changing the scan mode. This is illustrated in FIG. 3 in which if the device is in an Idle CDMA state 10 the devise monitors whether the device enters an EVDO traffic state in step 32. If yes, the mobile device proceeds to step 34 in which it hides the network selection menu and then proceeds to step 36 in which it monitors whether the device has ended the EVDO traffic state.

Once the device has ended the EVDO traffic state, the mobile device proceeds to step 38 in which the network selection mode menu is again revealed and the mobile device goes back to step 32 to monitor when a traffic state is entered.

In accordance with an implementation, a configuration option may be provided for the user to opt between the scan mode selection menu being hidden during an EVDO traffic state, and a prompt being displayed as the user interacts with the scan mode selection menu during an EVDO traffic state, the prompt asking for confirmation to proceed with scan mode changes having the above mentioned consequences.

As will be appreciated by those skilled in the art, various options for the hiding of a network selection menu are available to a designer.

Figure 4:
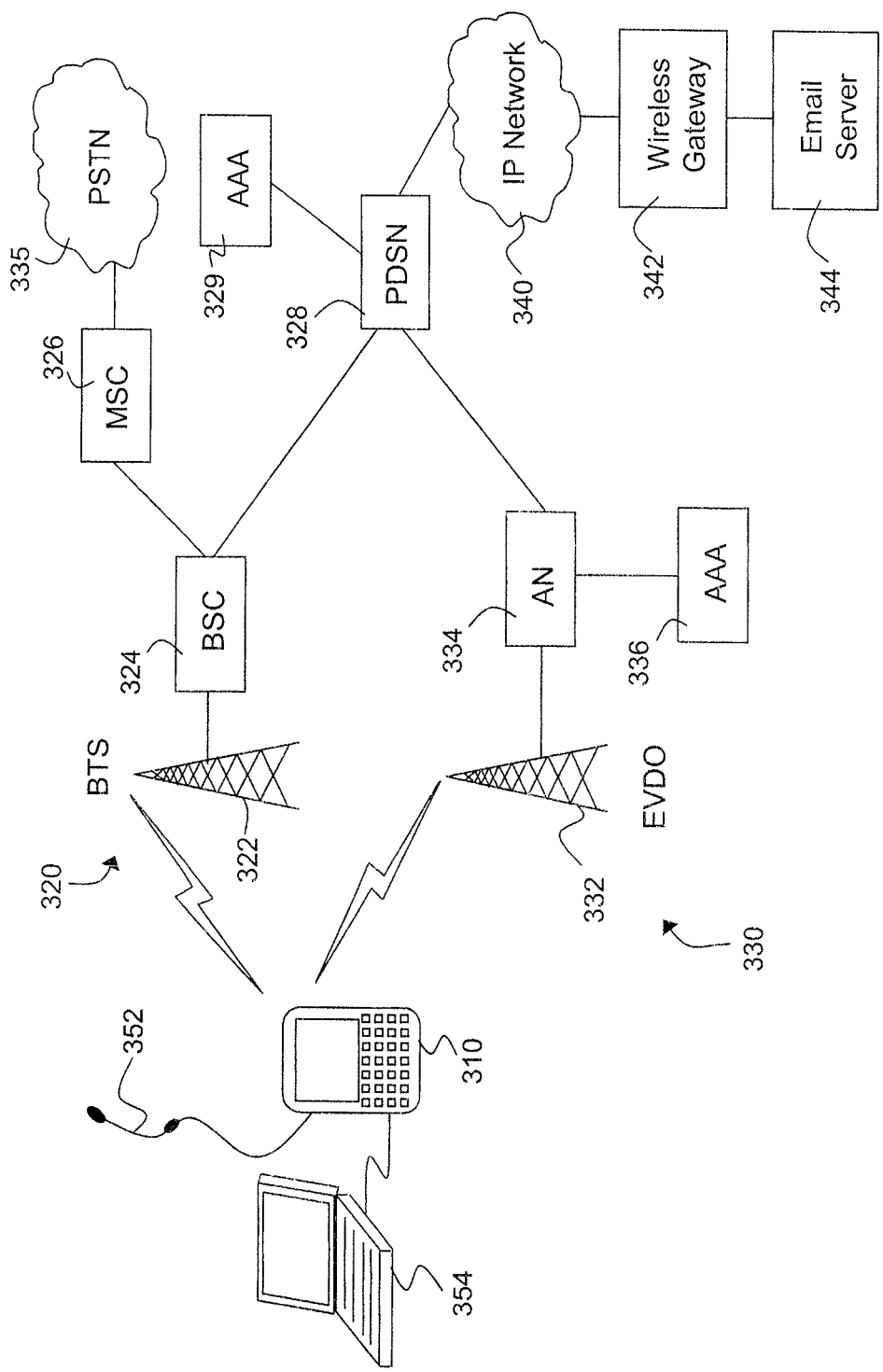
FIG. 4 is a simplified block diagram showing various components within a CDMA 1x/EVDO network.

Reference is now made to FIG. 4. FIG. 4 is a block diagram of an exemplary wireless data network in accordance with the present application and with which the various embodiments of the method of the instant application may cooperate. FIG. 4 shows a block diagram of a wireless data device 310 and exemplary CDMA 1x network 320, an exemplary EVDO network 330, a public switched telephone network (PSTN) 335, a data network 340, wireless gateway 342 and e-mail server 344 with which the instant techniques of this application may cooperate. The wireless data device 310 is preferably a two-way communication device having data and voice communication capabilities.

CDMA network 320 is comprised of a based transceiver station (BTS) 322 and a base station controller (BSC) 324. Base station controller 324 communicates with a mobile switching centre 326 which as will be appreciated, is a circuit switched only component communicating with PSTN 335. Base station controller 324 further communicates with a packet data serving node (PDSN) 328 which is a packet switched only component. PDSN 328 further communicates with IP network 340.

EVDO network 330 contains an EVDO sector 332 which communicates with access node (AN) 334. Since the EVDO network 330 is a data only network, access node 334 communicates only with PDSN 328 and not with any circuit switch components.

An authentication, authorization and accounting node 336 is associated with AN 334, and a similar node 329 is associated with PDSN 328.

Operationally, mobile device 310 communicates wirelessly with CDMA network 320 using BTS 322 and BSC 324 to gain access to the CDMA 1x network. As indicated above, the CDMA 1x network is given priority and the establishment of the CDMA network occurs prior to any EVDO network connection being established.

Mobile device 310 sends and receives both data and voice services through CDMA network 320 until an EVDO network connection with established. Base station controller 324 communicates with circuit switch services provided by MSC 326 such as voice and short message service (SMS) via PSTN 335.

Prior to an EVDO connection being established, mobile device 310 further communicates wirelessly with BTS 322 and BSC 324 to gain access to packet data services provided by PDSN 328, such as e-mail, wireless application protocol (WAP) and other data services via data network 340. Such services are provided through wireless gateway 342 and servers such as e-mail server 344.

Once a network connection is established with CDMA 1x network 320 and the mobile device enters CDMA 1x idle state, wireless device 310 establishes a connection with EVDO network 330. This is done through EVDO sector 332 and AN 334. In this way, mobile device 310 gains access to packet data services provided by PDSN 328 using EVDO network 330. Subsequent to the establishment of an EVDO network connection with mobile device 310, CDMA network 320 is used to provide circuit switched services such as voice and SMS while EVDO network 330 is used to provide packet data services such as e-mail and WAP.

As will be appreciated by those skilled in the art, wireless device 310 can include voice communication means such as a headpiece 350 or a user can communicate directly into the wireless device 310.

A further advantage of the present system is that due to high transfer rates associated with EVDO networks wireless device 310 can be used as a wireless modem and be connected through various means such as a USB or other serial port, or by short range wireless communications with a computer 354. Computer 354 can then gain access to data network 340 through EVDO network 330 using mobile device 310 as the modem.

Figure 5:
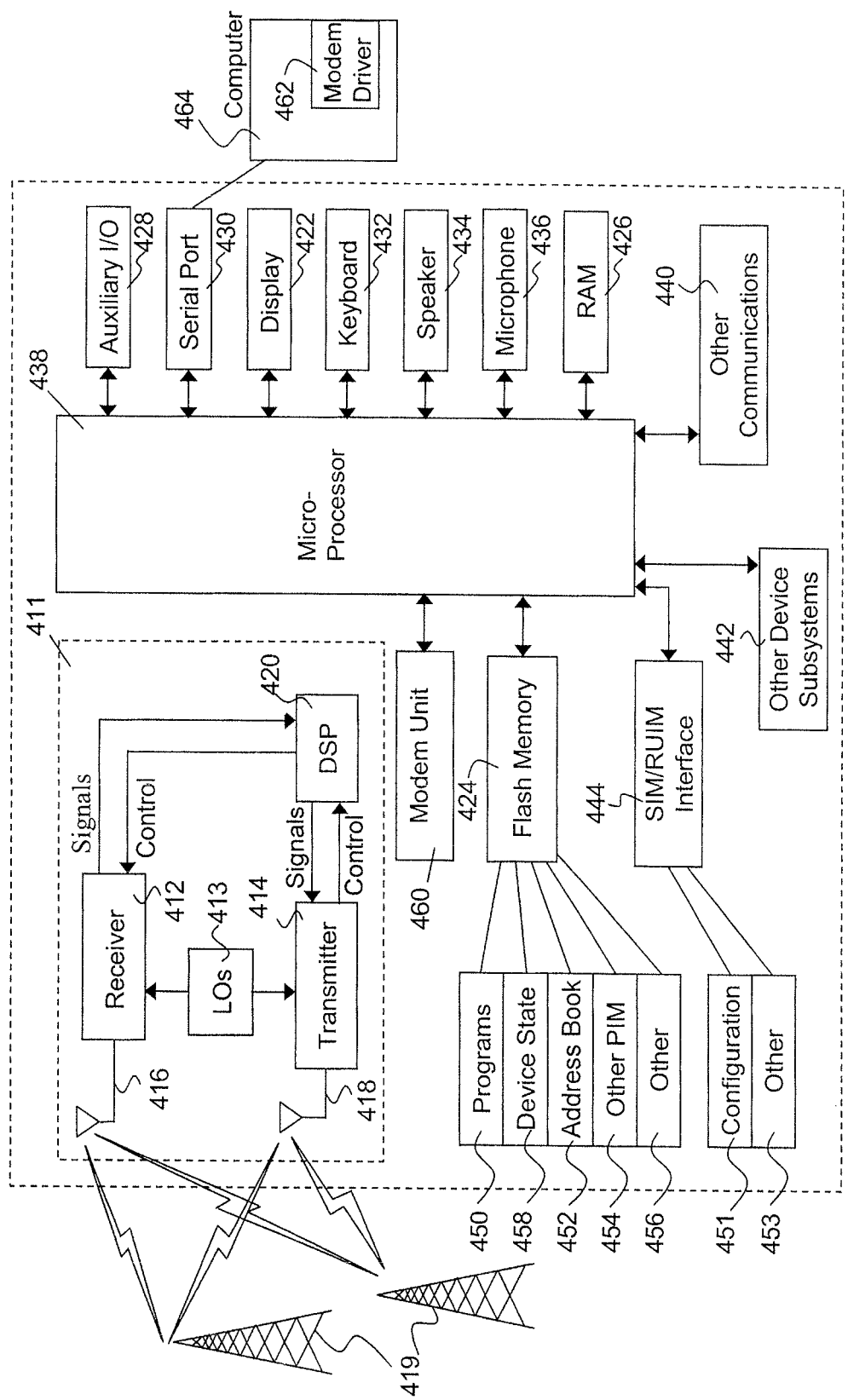
FIG. 5 is a block diagram of an exemplary mobile device that can be used with the present application.

Reference is now made to FIG. 5. FIG. 5 is a block diagram illustrating a mobile station apt to be used with preferred embodiments of the apparatus and method of the present application. Mobile station 400 is preferably a two-way wireless communication device having at least voice and data communication capabilities. Mobile station 400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 400 is enabled for two-way communication, it will incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate. For example, mobile station 400 may include a communication subsystem 411 designed to operate within the CDMA 1x/EVDO hybrid system.

Network access requirements will also vary depending upon the type of network 419. In some CDMA networks network access is associated with a subscriber or user of mobile station 400. A CDMA mobile station may require a removable user identity module (RUIM) or a subscriber identity module (SIM) card in order to operate on a CDMA network. The SIM/RUIM interface 444 is normally similar to a card-slot into which a SIM/RUIM card can be inserted and ejected like a diskette or PCMCIA card. The SIM/RUIM card can have approximately 64K of memory and hold many key configuration 451, and other information 453 such as identification, and subscriber related information.

When required network registration or activation procedures have been completed, mobile station 400 may send and receive communication signals over the network 419. As illustrated in FIG. 5, network 19 can consist of multiple base stations communicating with the mobile device. For example, in a hybrid CDMA 1x EVDO system, a CDMA base station and an EVDO base station communicate with the mobile station and the mobile station is connected to both simultaneously. The EVDO and CDMA 1x base stations use different paging slots to communicate with the mobile device.

Signals received by antenna 416 through communication network 419 are input to receiver 412, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile station 400 preferably includes a microprocessor 438 which controls the overall operation of the device. Communication functions, including at least data and voice communications, are performed through communication subsystem 411. Microprocessor 438 also interacts with further device subsystems such as the display 422, flash memory 424, random access memory (RAM) 426, auxiliary input/output (I/O) subsystems 428, serial port 430, two or more keyboards or keypads 432, speaker 434, microphone 436, other communication subsystem 440 such as a short-range communications subsystem and any other device subsystems generally designated as 442. Serial port 430 could include a USB port or other port known to those in the art.

Some of the subsystems shown in FIG. 5 perform communication-related functions, Whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 is preferably stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Microprocessor 438, in addition to its operating system functions, preferably enables execution of software applications on the mobile station. A predetermined set of applications that control basic operations, including at least data and voice communication applications for example, will normally be installed on mobile station 400 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 419. In a preferred embodiment, the PIM data items are seamlessly integrated, synchronized and updated, via the wireless network 419, with the mobile station user's corresponding data items stored or associated with a host computer system. Further applications may also be loaded onto the mobile station 400 through the network 419, an auxiliary I/O subsystem 428, serial port 430, short-range communications subsystem 440 or any other suitable subsystem 442, and installed by a user in the RAM 426 or preferably a non-volatile store (not shown) for execution by the microprocessor 438. Such flexibility in application installation increases the functionality of the device and may provide enhanced on-device functions, communication-related functions, or both. For example, secure communication applications may enable electronic commerce functions and other such financial transactions to be performed using the mobile station 400.

In a data communication mode, a received signal such as a text message or web page download will be processed by the communication subsystem 411 and input to the microprocessor 438, which preferably further processes the received signal for output to the display 422, or alternatively to an auxiliary I/O device 428. A user of mobile station 400 may also compose data items such as email messages for example, using the keyboard 432, which is preferably a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of mobile station 400 is similar, except that received signals would preferably be output to a speaker 434 and signals for transmission would be generated by a microphone 436. Alternative voice or audio I/O subsystems, such as a voice message recording subsystem, may also be implemented on mobile station 400. Although voice or audio signal output is preferably accomplished primarily through the speaker 434, display 422 may also be used to provide an indication of the identity of a calling party, the duration of a voice call, or other voice call related information for example.

Serial port 430 in FIG. 5, would normally be implemented in a personal digital assistant (PDA)-type mobile station for which synchronization with a user's desktop computer (not shown) may be desirable, but is an optional device component. Such a port 430 would enable a user to set preferences through an external device or software application and would extend the capabilities of mobile station 400 by providing for information or software downloads to mobile station 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the mobile device to a computer to act as a modem. A modem unit 460 interacts with a driver 462 in a computer 464 to allow data transfer through the mobile device. With EVDO networks, a high rate of data transfer can be achieved using the mobile device 400 as the modem. Depending on the interface provided by driver 462, unit 460 could be an IP routing module. Further, driver 462 could provide either a modem interface or alternatively an IP interface to computer 464. As will be appreciated by those skilled in the art, the combination of driver 462 and unit 460 must provide a communication interface for computer 430 to be enabled for communications originated and/or terminated at computer 430.

Other communications subsystems 440, such as a short-range communications subsystem, is a further optional component which may provide for communication between mobile station 400 and different systems or devices, which need not necessarily be similar devices. For example, the subsystem 440 may include an infrared device and associated circuits and components or a Bluetooth™ communication module to provide for communication with similarly enabled systems and devices.

Advantageously, communications originating and/or terminating at computer 464 benefit from the techniques of this application as module 460 preferably uses the techniques taught herein in a manner that is transparent to computer 464.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for user data traffic handling for an Evolution Data Only or Data Optimized 'EVDO' enabled Code Division Multiple Access 'CDMA' prioritized hybrid communications mode mobile device, the method comprising:
   providing a user selectable option for selection of a scan mode of said mobile device; and
   preventing the mobile device from performing the selection made in the user selectable option if said mobile device is in an EVDO traffic state until no EVDO traffic state exists.

2. The method of claim 1, including
   monitoring whether a user changes a scan mode on the mobile device; and if the user changes the scan mode, checking whether the mobile device is in an EVDO traffic state; and if yes delaying said voice services system selection until the EVDO traffic state is ended.

3. The method of claim 2, wherein the mobile device performs the voice services system selection once the EVDO traffic state ends.

4. The method of claim 1, including monitoring whether the mobile device is in an EVDO traffic state, and if yes, preventing the user from accessing a scan mode menu on the mobile device.

5. The method of claim 1, including hiding the scan mode selection menu when the mobile device is in an EVDO traffic state.

6. An Evolution Data Only or Data Optimized 'ENDO' enabled Code Division Multiple Access 'CDMA' prioritized hybrid communications mode mobile device, the mobile device comprising:

a processor; and a communications subsystem, wherein the processor and communications subsystem are configured to: provide a user selectable option for selection of a scan mode of said mobile device; and prevent the mobile device from performing the selection made in the user selectable option if said mobile device is in an EVDO traffic state until no EVDO traffic state exists.

7. The mobile device of claim 6, wherein the processor and communications subsystem are further configured to:

monitor whether a user changes a scan mode on the mobile device;

check whether the mobile device is in an EVDO traffic state; and delay said voice services system selection, the delaying the voice services system selection delaying voice services system selection monitoring detects that the user changed the scan mode and if the checking finds the mobile device is in an EVDO traffic state.

8. The mobile device of claim 6, wherein the processor and communications subsystem are further configured to monitor whether the mobile device is in an EVDO traffic state; and prevent a user from accessing a scan mode menu on the mobile device if the monitoring detects the mobile device is in an EVDO traffic state.

9. The mobile device of claim 6, wherein the processor and communications subsystem are further configured to hide a scan mode selection menu when the mobile device is in an EVDO traffic state.

\* \* \* \* \*